United States Patent
Mair et al.

(10) Patent No.: US 12,024,012 B2
(45) Date of Patent: Jul. 2, 2024

(54) VEHICLE AND MEASUREMENT METHOD

(71) Applicant: Bundesrepublik Deutschland, vertreten durch die Bundesministerin für Wirtschaft und Energie, Berlin (DE)

(72) Inventors: Georg W. Mair, Großbeeren (DE); André Schoppa, Schönefeld (DE); Mariusz Szczepaniak, Berlin (DE)

(73) Assignee: Bundesrepublik Deutschland, vertreten durch die Bundesministerin für Wirtschaft und Energie, Berlin (DE)

( * ) Notice: Subject to any disclaimer, the term of this patent is extended or adjusted under 35 U.S.C. 154(b) by 724 days.

(21) Appl. No.: 17/258,225

(22) PCT Filed: Jul. 3, 2019

(86) PCT No.: PCT/EP2019/067892
§ 371 (c)(1),
(2) Date: Jan. 6, 2021

(87) PCT Pub. No.: WO2020/007933
PCT Pub. Date: Jan. 9, 2020

(65) Prior Publication Data
US 2021/0268897 A1    Sep. 2, 2021

(30) Foreign Application Priority Data

Jul. 6, 2018    (DE) .................... 10 2018 116 423.8

(51) Int. Cl.
*B60K 15/07*    (2006.01)
*B60K 15/03*    (2006.01)
(Continued)

(52) U.S. Cl.
CPC ............ *B60K 15/07* (2013.01); *G01G 19/08* (2013.01); *G01G 19/10* (2013.01);
(Continued)

(58) Field of Classification Search
CPC .................. B60K 15/07; B60K 15/077; B60K 15/03006; B60K 2015/0319;
(Continued)

(56) References Cited

U.S. PATENT DOCUMENTS

| | | | |
|---|---|---|---|
| 5,393,936 A | | 2/1995 | Tyhy et al. |
| 5,929,388 A | * | 7/1999 | Uehara .................. G01G 19/08 177/136 |

(Continued)

FOREIGN PATENT DOCUMENTS

| | | |
|---|---|---|
| DE | 19519712 A1 | 12/1996 |
| DE | 10053490 A1 | 5/2002 |

(Continued)

OTHER PUBLICATIONS

Office Action dated Mar. 28, 2023 issued for corresponding KR Patent Application No. 10-2021-7002645.

(Continued)

*Primary Examiner* — Jacques M Saint Surin
(74) *Attorney, Agent, or Firm* — Bachman & LaPointe, P.C.

(57) ABSTRACT

A vehicle (100, 200, 300, 400) includes a chassis (110, 210, 310, 410), a gas storage tank (120, 220, 320, 420) for a gas, and a gas storage tank (120, 220, 320, 420) arranged between the chassis (110, 210, 310, 410) and the gas storage tank (120, 220, 320, 420) and connected to the chassis (110, 210, 310, 410) and the gas storage tank (120, 220, 320, 420), the first weighing device (140, 240, 340, 440) being (Continued)

arranged to measure a force exerted by the gas storage tank (120, 220, 320, 420) on the first weighing device (140, 240, 340, 440).

19 Claims, 4 Drawing Sheets

(51) Int. Cl.
  *G01G 19/08* (2006.01)
  *G01G 19/10* (2006.01)
(52) U.S. Cl.
  CPC .............. *B60K 2015/0319* (2013.01); *B60K 2015/03315* (2013.01); *B60K 2015/03361* (2013.01)
(58) Field of Classification Search
  CPC .......... B60K 2015/03315; B60K 2015/03361; B60K 2015/03019; G01G 19/08; G01G 19/10; F17C 13/023; F17C 2201/0109; F17C 2201/054; F17C 2201/056; F17C 2203/018; F17C 2203/03; F17C 2205/0134; F17C 2205/0192; F17C 2205/196; F17C 2205/0364; F17C 2221/012; F17C 2221/033; F17C 2223/0123; F17C 2223/0153; F17C 2223/033; F17C 2223/036; F17C 2250/034; F17C 2250/0421; F17C 2250/043; F17C 2250/0439; F17C 2250/0469; F17C 2250/0482; F17C 2260/026; F17C 2270/0105; F17C 2270/0171; F17C 2270/0173; F17C 2270/0176; F17C 2270/0178; F17C 2270/0184; F17C 2270/0189; Y02E 60/32; F16C 19/26; F16C 35/04; B60Y 2200/14; B60Y 2200/30; B60Y 2200/51; B60Y 2200/91; B60Y 2400/304
  USPC ........................................................ 177/136
  See application file for complete search history.

(56) References Cited

U.S. PATENT DOCUMENTS

| | | | | |
|---|---|---|---|---|
| 6,558,863 | B2* | 5/2003 | Rokutanzono | G03G 5/0507 399/116 |
| 8,096,057 | B2* | 1/2012 | Schommer | G01B 11/2755 33/286 |
| 8,281,820 | B2* | 10/2012 | White | F17C 7/02 141/37 |
| 9,804,017 | B2* | 10/2017 | Cornu | G01G 19/022 |

FOREIGN PATENT DOCUMENTS

| | | |
|---|---|---|
| DE | 102004050827 A1 | 6/2005 |
| DE | 102004021832 A1 | 12/2005 |
| DE | 102015206825 A1 | 9/2016 |
| DE | 102015218230 B3 | 11/2016 |
| DE | 102017001370 A1 | 8/2018 |
| JP | 2005127171 A | 5/2005 |
| JP | 4254475 B2 | 4/2009 |
| JP | 4762688 B2 | 8/2011 |
| JP | 5337118 B2 | 11/2013 |
| JP | 5337129 B2 | 11/2013 |
| KR | 20050039571 A | 4/2005 |

OTHER PUBLICATIONS

Japanese office action for patent application No. 2020-569850 dated Feb. 14, 2022.
International search report for patent application No. PCT/EP2019/067892 dated Dec. 12, 2019.
Japanese office action dated Jun. 30, 2022 issued for corresponding Japanese Patent Application No. 2020-569850.
Japan Decision to Grant dated Aug. 23, 2022 issued for corresponding Japanese Patent Application No. 2020-569850.
Office Action dated Sep. 13, 2022 issued for corresponding KR Patent Application No. 10-2021-7002645.
Office Action dated Sep. 21, 2023 issued for corresponding KR Patent Application No. 10-2021-7002645.

* cited by examiner

VEHICLE AND MEASUREMENT METHOD

BACKGROUND OF THE INVENTION

The present invention relates to a vehicle, in particular a vehicle with a gas storage for compressed gases such as compressed natural gas and compressed hydrogen or another propellant gas, as well as a measuring method for determining a weight of the gas storage and/or a weight of a gas filling of the gas storage.

Until now, pressurized gas containers and propellant gas storage tanks have usually been filled according to the pressure. Since the pressure in a closed space is directly dependent on the temperature, the temperature in the pressure vessel must be homogeneous and precisely known for a pressure-controlled filling with a defined filling quantity. However, since the temperature in the container is unevenly changed by a filling, it is not possible to obtain the temperature distribution information necessary for an exact pressure-controlled filling within a time frame of a few minutes to hours without considerable effort. Especially when filling vehicle gas tanks at filling stations, the inhomogeneous temperature at the tank cannot be measured sufficiently reliably and/or cannot be communicated reliably with the filling station over the entire area.

Thus, the widespread filling of vehicle tanks and other gas pressure vessels according to pressure within acceptable filling times is a relatively inaccurate process, which also leads to corresponding uncertainties in the level measurement of the tank. Especially in the case of fast vehicle filling, if one of the abort criteria maximum pressure or maximum temperature is reached during the filling process at the filling station, it is often not clear how much gas has actually been filled in. At least part of the uncertainty is often caused by the inaccuracy of the actual filling level before the filling process starts.

As a result, the (remaining) driving range of a vehicle can only be determined relatively imprecisely. This can even lead to an unwanted vehicle failure due to a too high estimated residual filling level of the vehicle.

SUMMARY OF THE INVENTION

In view of the above, the present invention proposes a vehicle and a measuring method as disclosed herein.

According to an embodiment, a vehicle comprises a chassis, a gas storage tank for a gas, in particular a gas storage tank for a compressed gas or a liquefied gas implemented as a gas pressure vessel, and a first weighing device arranged between the chassis and the gas storage tank and connected to the chassis and the gas storage tank. The first weighing device is adapted to measure a force exerted by the gas storage tank on the first weighing device, in particular a weight force exerted by the gas storage tank on the first weighing device. In particular, the first weighing device is arranged to determine a (first) measured value for the weight force exerted on it by the gas storage.

This setup allows to determine the weight of the gas storage tank, in the following also referred to as gas storage, including a gas filling and thus, if the empty weight of the gas storage is known, the weight or mass of the gas filling easily and sufficiently accurately. This also allows a more precise determination of a filling quantity when refueling (refilling) the gas storage tank than is possible with the given relatively short desired refueling time with refueling according to pressure. As the temperature distribution in the system is practically irrelevant for the determination of the filling quantity by weighing, the above-mentioned disadvantages of filling by pressure can be avoided in a simple way. In addition to allowing checking of the tank quantity/fairer billing during refueling, this also allows a more accurate determination of the (remaining) range of the (motorized) vehicle, which is independent of pressure and temperature in the gas storage tank.

In particular, the gas storage tank can be a tank fluidically connected to a fuel cell in combination with an electric motor, a bivalent combustion engine and/or a monovalent gas engine, to drive the vehicle.

However, the gas storage may also be a gas pressure storage for the transport of a corresponding gas which is not or at least not exclusively used for the propulsion of the vehicle or for consumption of the vehicle, in general.

It may even be provided that the vehicle as a tank vehicle has both a gas storage tank connected to an engine as a propellant gas tank and a gas pressure storage tank for the transport of the gas, which have respective weighing devices.

The construction of the gas storage tank, especially the construction of the wall of the gas storage tank can be adapted to the gas to be stored and/or according to safety requirements. For example, the wall of a gas storage tank for storing temperature-liquefied gases can have an insulation layer.

For the sake of simplicity, the gas quantity (gas mass) stored in the gas storage tank is also referred to as tank content in the following.

The vehicle can be a motor vehicle for road transport, for example a passenger car, a bus or a truck, e.g. a tanker, but also a rail vehicle, a watercraft or an aircraft (with rocket propulsion for lift, displacement lift or aerodynamic lift).

The gas storage tank can be at least substantially cylindrical, i.e. it can be cylindrical at least up to the end areas. For example, the gas storage tank may have a cylindrical main section, which may define a longitudinal axis of the gas storage tank, and one end section or two end sections opposite each other in the direction of the longitudinal axis, the main section typically providing at least 75%, at least 80% or even at least 85% of the internal volume of the gas storage tank. In the following, the end sections are also referred to as the ends of the gas storage tank. In particular, the gas storage may be implemented as a pressurized glass cylinder.

However, the gas storage can also be implemented as a gas storage system or in several parts. For example, the gas storage tank or the gas storage system can be formed by two or more gas pressure cylinders mechanically connected to each other at least in a substantially rigid manner, and fluidically connected to each other via one or more pressure gas lines or pipes.

In other words, the vehicle may have one or even more additional gas storage tanks for the gas which are mechanically rigid and fluidically connected to the gas storage tank. Due to the mechanically rigid connection of the gas storage tanks, it is sufficient for a sufficiently accurate determination of the tank content if the force exerted by one of the gas storage tanks on the first weighing device is measured.

Furthermore, the gas storage tank(s) is/are typically designed for an operating pressure of at least 100 bar, at least 200 bar, even at least 500 bar, or even at least 700 bar. In case of temperature liquified or pressure liquified gases, a test pressure and pressure resistance, respectively, of at least 10 bar, typically at least 25 bar, is to be assumed.

For reasons of simplicity, the following exemplary embodiments mainly refer to a gas storage tank.

During weighing, the first weighing device typically carries at least part of the weight of the gas storage tank.

In addition, the first weighing device is typically fixed to the chassis.

Typically, the gas storage tank lies directly or indirectly on the first weighing device, at least during weighing.

In particular, a first end of the gas storage tank may lie and rest, respectively, on the first weighing device and/or the first weighing device for weighing may bear part of the load of the gas storage tank.

In addition, the first weighing device can form part of a bearing arrangement for the gas storage tank connected to the chassis.

According to an embodiment, the vehicle has a second weighing device located between the chassis and the gas storage tank and connected to the chassis and the gas storage tank. The second weighing device is adapted to measure a force exerted by the gas storage tank on the second weighing device.

Typically, a second end of the gas storage tank opposite the first end lies/rests directly or indirectly on the second weighing device for weighing the gas storage tank.

By using two weighing devices connected to respective ends of the gas storage tank, the guiding of the gas storage tank during weighing can be made easier and/or more robust. In addition, the weight of the gas storage tank or the tank contents can be determined more accurately and/or reliably by using two weighing devices.

The second weighing device can also form part of a bearing (arrangement).

Typically, the first and/or the second respective weighing device is implemented as a respective load cell. For example, the load cell can have a respective strain gauge.

The first and/or the second weighing device may also have and/or be provided by a component other than a load cell suitable for weighing, in particular a force transducer (also called force sensor). The respective component can participate, at least during the measurement, to a force path from the gas storage tank to the chassis and/or one (or more) wheel bearing(s) of the vehicle.

In order to enable a sufficiently accurate measurement of the filling quantity, the weighing device has a weight resolution appropriate/corresponding to the nominal pressure at a given temperature depending on the type of gas and the quantity of gas to be filled. Equivalent to a resolution of the pressure in the gas storage tank, the weight resolution allows the gas mass to be determined in small steps of less than 1% of the filling maximum (e.g. at least 2 bar for CNG storage (gas storage tank for compressed natural gas), or e.g. 0.3 bar for LPG (LPG).

The conversion of the weight resolution in a resolution of the pressure p can be done e.g. by means of an equation of state of real gases, in particular by means of the thermal equation of state of ideal gases, which was supplemented by a real gas factor Z:

$$p*V=Z*R*T.$$

For example, the real gas factor for natural gas at a temperature of T of 293.15 K (20° C.) is Z=0.813.

Thus, for a 50-l gas storage tank filled with natural gas (with a molar mass of 16.043 g/mol) at a pressure of 200 bar, a mass m of the inserted natural gas of 8.096 kg is obtained. Under these conditions a pressure difference of 1 bar corresponds to approx. 40 g.

Accordingly, the weighing device typically has a relative weight resolution (resolution in kg/weighing range in kg) of at least 1% or 0.5% even 0.4% (40 g/10 kg).

This allows much more accurate measurements/fillings than with pressure-controlled gas filling. If a 50-l gas storage tank is pressure-controlled filled with natural gas up to 200 bar and an assumed effective average temperature increase to 50° C. (to 323.15° K, real gas factor Z=0.879) occurs, the gas storage tank is only filled with approx. 6.7 kg, which corresponds to a difference/error of approx. 16%!

This example calculation shows that in comparison to filling the gas storage tank according to pressure, a much more precise determination of the filling quantity (mass) can be achieved by determining the gas mass in the gas storage tank by means of weighing, in particular a continuous weighing of the gas mass during the filling process of a gas storage tank (e.g. of a built-in car tank).

Especially for high pressures, the desired weight resolution can typically be calculated more accurately using value tables for the p-T-m relations for the gases or gas mixtures or associated interpolation functions. For example, the respective p-T-m relations can be taken from the "REFPROP" database ("Reference Fluid Thermodynamic and Transport Properties Database") of NIST ("National Institute of Standards and Technology", Gaithersburg, Maryland, USA).

Depending on the gas tank to be filled, the weighing range of the weighing device can be at least 10 kg or even at least 1000 kg.

A typically water-lit internal volume of the gas storage tank can be at least 10 l, at least 20 l or even at least 150 l. In case of gas transport, the inner volume of the gas storage tank can be at least 50 l, at least 500 or even at least 5000 l with a correspondingly higher weighing range.

In order to enable the weight of the gas storage tank or the tank contents to be determined as accurately as possible, the first end and/or the second end can be connected to a respective flexible and/or slidable pressure line, typically via respective valves (first or second valve).

Typically, a bearing arrangement is at least in a first state, which is suitable for weighing the gas storage tank/determining its tank content, implemented in such a way that the gas storage tank or its ends connected to the respective weighing device/load cell can/can move in the direction of the working direction of the respective weighing device/load cell (typically in a guided manner). This movement and thus the measuring accuracy could be affected by too stiff pressure lines.

The bendable and/or displaceable pressure lines can have a hose or a pipe spiral or be formed by a hose or a pipe spiral.

If the gas storage is a gas storage tank connected to an engine or a transport storage, both ends of the gas storage can be connected to a respective flexible or movable pressure line (pressure pipe).

The first valve and/or the second valve are typically controllable or adjustable.

Typically, the bearing arrangement and bearing, respectively, has a first bearing block connected to the first end, even more typically the first bearing block and a first linear guide for the first bearing block.

In addition, the bearing arrangement may include a second bearing block connected to the second end, typically the second bearing block and a second linear guide for the second bearing block.

Typically, the respective linear guide is firmly connected to the chassis of the vehicle and/or is implemented or designed in such a way that its direction of movement corresponds at least substantially, i.e. up to a maximum deviation of 5% or even a maximum deviation of 2%, to a working direction of the respective weighing device.

In addition, the bearing can have a first spring, a second spring, a first damper and/or a second damper.

The first spring can be arranged in the bearing in such a way that it exerts in a preloaded state a corresponding spring force (spring preload) on the first bearing block in the direction of the first weighing device (working direction of the first weighing device), typically from top to bottom.

Similarly, the second spring can be arranged in the bearing so that it exerts in a preloaded state a corresponding spring force (spring preload) on the second bearing block in the direction of the second weighing device (working direction of the second weighing device), typically from top to bottom.

Due to the (preloaded) first and/or second spring, the respective bearing block and, thus, the gas storage tank is pressed in the direction of the weighing device(s), e.g. downwards. This can prevent the gas storage tank from performing stronger movements in the respective linear guide when driving due to vibrations. For this reason, respective dampers are typically also provided to dampen the movement of the gas storage tank or the respective bearing blocks. In addition, the use of preloaded springs and/or dampers and the associated lower movement or higher damping of the movement (shorter decay time) can also facilitate weight measurement during a short stop of the vehicle and/or even while the vehicle is moving.

If the tank content is determined/calculated while driving, this is typically done by taking into account one or more measured values (measured data) (determined by means of one or more acceleration sensors connected to the gas storage tank or attached to the gas storage tank) for the acceleration of the gas storage tank in vertical direction (parallel to the acceleration due to gravity).

According to a further embodiment, the bearing has a first arresting element for arresting the first bearing block in the direction of movement of the first linear guide (working direction of the first weighing device) and/or a second arresting element for arresting the second bearing block in the direction of movement of the second linear guide (working direction of the second weighing device). Therefore, the respective bearing block and, thus, the gas storage tank can be reliably fixed by the first and/or second arresting element during the travel of the vehicle.

The respective locking element can be a punch, spindle or mandrel.

In addition, the bearing typically has a respective drive means for moving the arresting element between its respective arresting position and its respective non-arresting position (in which weighing of the gas storage tank is possible). This could be, for example, a respective electric motor or a pneumatic or hydraulic piston.

In particular it may be provided that the locking element(s) can be moved in the direction of movement of the respective linear guide (by the respective drive means). This allows the gas storage tank to be moved away from the weighing devices when/for arresting. In this unloaded state, the weighing device(s) should provide a respective typically small reference measurement value. In this way a possible drift of the respective weighing device during the typically very long operating time of up to several years can be taken into account.

Typically, the gas storage tank (on one side) is mounted so that it can move in the direction of its longitudinal axis. This allows to avoid mechanical tensions which otherwise might occur due to a change in the expansion of the gas storage tank in the direction of its longitudinal axis as a result of pressure changes during refueling or while driving. In particular, the second end of the gas storage tank can be mounted movably in the direction of the longitudinal axis of the gas storage tank (implemented as a floating bearing in this direction), and the first end can be fixed in all translatory directions (fixed bearing).

Typically, the bearing arrangement or mounting for the gas storage tank has a first state (unlocked state) in which the gas storage device is movably mounted relative to the chassis in a further direction, which is at least substantially perpendicular to the longitudinal axis of the gas storage device and/or at least substantially parallel to the working direction of the first and/or second weighing device, typically guided movably mounted, even more typically loaded with a spring preload and/or damped guided movably mounted.

According to an embodiment, the bearing arrangement has a second state (locked state), in which the gas storage tank, the first end and/or the second end in the further direction is/are at least substantially immovably connected to the chassis, and/or in the further direction is/are at least substantially immovably mounted to the chassis.

However, it may also be provided that the second end of the gas storage tank is translatory fixed (fixed with respect to translations), e.g. by means of a clamp bearing, but is mounted so as to be rotatable about an at least substantially horizontally oriented first axis, i.e. mounted so as to be rotatable about a first axis whose angular deviation from the horizontal is at maximum 10° or even only at maximum 3°. This means that the gas storage tank is also rotatably mounted around the first axis in the non-locked state.

Clamp bearings such as a one- or two-piece clamp with threaded pin and clamped bearing half-shells are releasable connections between typically round components or component sections. Clamped bearings can consist of one or more shaped parts (e.g. prisms, half pipes, clamps) made of steel or another suitable material. In particular, a clamp bearing can accommodate a section of the second end of the gas storage tank implemented as a neck or boss. The clamping action/force transmission is achieved by appropriate clamping of the formed parts of the clamped bearing by frictional connection, possibly supported by positive locking, sometimes also by calculated/predetermined deformation. For example, the clamping effect with calculated deformation can be achieved by typically straight prisms acting on the round neck of the gas storage tank.

The clamp bearing can be fixed to the frame translatorily in all directions and allow rotation about the first axis. Typically, however, the clamp bearing inhibits a rotational movement of the gas storage tank around axes perpendicular to the first axis. Thus, the rotational movement of the gas storage tank during filling/emptying of the gas storage tank can at least substantially be limited to a rotational movement around the first axis. This also facilitates a weighing of the gas storage tank/tank contents which is insusceptible to disturbances.

Typically, the vehicle has a measuring and/or evaluation unit connected to the first and/or second weighing device and/or a level indicator for the tank contents connected to the first and/or second weighing device and/or the measuring and/or evaluation unit.

The measuring and/or evaluation unit may form part of a vehicle control system of the vehicle, typically connected to the engine, valves and other components of the vehicle.

The measuring and/or evaluation unit can also be connected to an acceleration sensor attached to the gas storage tank to measure an acceleration of the gas storage tank.

For example, it may be envisaged to measure weight by means of the first and/or the second weighing device only if an (absolute) acceleration value measured by the accelerometer is below a predetermined threshold, for example when the vehicle is stationary and any vibrations of the gas storage tank have decayed.

However, it may also be provided that the acceleration and the weight of the gas cylinder is measured during the ride and the measured acceleration values are used to correct the measured weight values of the gas cylinder. In this way, irregularities in the measured value for the weight, which are due to the journey, can be corrected.

For safety reasons, a temperature sensor may also be mounted on the gas storage tank.

The temperature sensor is typically connected to the vehicle controller, the measuring and/or evaluation unit and/or the display unit.

Typically, the measuring and/or evaluation unit or the vehicle control system is set up to trigger the opening of the first valve for filling the gas storage tank only when a temperature value transmitted by the temperature sensor reaches or falls below a pre-defined first temperature threshold value.

In addition, the measuring and/or evaluation unit or the vehicle control unit (for safety reasons) can be set up to trigger the closing of the first valve if the temperature value transmitted by the temperature sensor reaches or exceeds a pre-defined second temperature threshold.

In addition, not least for safety reasons, a pressure sensor fluidically connected to the gas storage tank can be provided.

For example, the measuring and/or evaluation unit or the vehicle control unit can be set up to trigger the closing of the first valve if a pressure value transmitted by the pressure sensor reaches or exceeds a pre-defined pressure threshold value.

In the following, the measuring and/or evaluation unit is also referred to as measuring unit.

Typically, the measuring unit is set up to perform the measuring methods explained in the following.

During a change of location of the vehicle, whether active (with its own drive) or passive (e.g. by means of a towing vehicle, ferry or passenger train), high accelerations can lead to strong dynamic loads on the bearing of the gas storage tank in the vehicle, which in turn can also influence the measuring accuracy of the first and/or second weighing device. A comparable effect can also occur due to a comparatively strongly changed expansion of the vehicle itself due to a high or low ambient temperature. For example, a local overload leading to plastic deformation could result in a shift/distortion of the calibration or other undesired change in the behavior of the weighing device(s) (load cell(s)).

In order to avoid this and/or to enable an independent calibration, a relieve of the bearing arrangement of the gas storage by a force transfer may be provided in or for the case of need (high forces or mechanical tensions), in particular in the area of the weighing device(s).

A simple possibility of force transfer, i.e. redirection of the force flow around the weighing device(s), consists in a (temporary or demand-dependent) stiffening of the bearing.

Alternatively or additionally, a respective parallel bearing can be activated if desired.

For example, a temporary fixation and/or stiffening of the bearing (especially the ends) of the gas storage tank in one working direction of the respective weighing device/load cell can be provided. The condition of the temporary fixation and/or stiffening of the storage may correspond to the second state of the bearing, in which the gas storage, the first end and/or the second end is/are even at least substantially immovably connected to the chassis.

This fixation and/or stiffening or the associated relief can also be done automatically, e.g. when "the ignition" of the vehicle is not activated (deactivated) or the vehicle starts moving.

According to an embodiment, a measuring method comprises the steps of determining a first measured value with the first weighing device of a vehicle as described herein, and using the first measured value to calculate a weight of the gas storage tank of the vehicle and/or a weight of a gas filling of the gas storage tank.

Typically, the measurement method involves determining a second measurement value with the second weighing device of the vehicle and using the second measurement value to calculate the weight of the gas storage tank and/or the weight of the gas filling of the gas storage tank.

It may also be provided that a spring force acting on the gas storage during the determination of the first or second measured value is taken into account when calculating the weight of the gas storage and/or the weight of the gas filling of the gas storage.

Typically, the calculated weight of the gas storage tank and/or the weight of the gas filling of the gas storage tank is stored, further processed and/or forwarded.

For example, the calculated respective weight can be compared and/or averaged with previous and/or subsequent weight values and/or output on a display device of the vehicle.

Furthermore, it may be provided to transfer the bearing arrangement of the vehicle to the first state before determining the first measured value and/or the second measured value.

In addition, it may be provided to determine the first and/or second measured value only if an acceleration value measured simultaneously or in the (supposedly) resting state before and after with the acceleration sensor is below an acceleration threshold value. However, it is also possible to correct the first and/or second measured value by calculation according to measured acceleration values.

Alternatively or in addition it may be provided that the acceleration value measured at the same time is taken into account when calculating the weight of the gas storage tank or the weight of the tank filling.

Furthermore, it may be provided to use measured values determined with the temperature and/or pressure sensor (for safety reasons) to control a filling process of the gas storage tank (opening/closing of valves etc.) and/or to use them for a comparative calculation to check the plausibility of the determined weight.

Typically, the first measured value and/or the second measured value are determined several times and used to calculate a respective weight of the gas storage tank or the gas filling of the gas storage tank.

The determination of the first and/or second measured value as well as the calculation of the weight of the gas storage tank or the gas filling can be carried out particularly easily and with high accuracy when the vehicle is stationary, e.g. during a short stop at a traffic light, during filling of the gas storage tank (tanks) with a gas from a filled gas buffer storage tank (at a filling station), and/or during filling of the gas buffer storage tank with a gas stored in the gas storage tank (a tank truck).

It may also be provided to activate a fixation and/or stiffening of the bearing arrangement of the gas storage tank if necessary, e.g. depending on the ignition of the vehicle and/or a state of motion of the vehicle, e.g. if the vehicle starts or is started moving, and/or to deactivate the fixation and/or stiffening before a measurement (determination of the measured values).

The embodiments described above can be combined with each other as desired.

BRIEF DESCRIPTION OF THE DRAWINGS

Further advantageous arrangements, details, aspects and features of the present invention are given in the dependent claims, the description and the attached drawings. Therein shows:

DETAILED DESCRIPTION

In FIGS. 1A through 5, identical reference numbers or reference numbers whose last two digits coincide designate similar parts or elements. For example, a part in FIG. 1A with a reference number 120 may correspond to an identical or similar part in FIG. 5 with a reference number 410.

For better orientation, FIGS. 1A to 5 each include a Cartesian coordinate system, where the z-direction represents the vertical direction and the x- and y-directions represent horizontal directions which are orthogonal to each other.

Figure 1A:
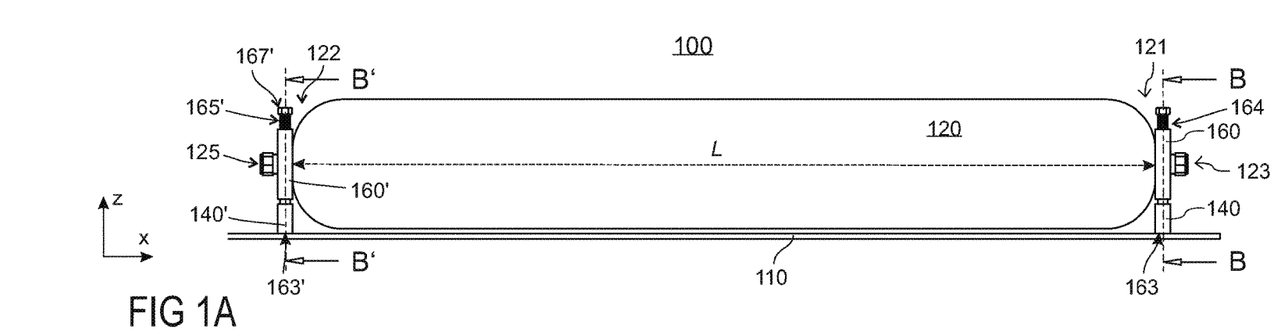
FIG. 1A a schematic side view of a vehicle with a gas storage tank according to an embodiment.

FIG. 1A shows a schematic side view or cross-sectional view of an inner part of a vehicle 100, which may be a motor vehicle. Accordingly, only a part of the chassis 110 or body, respectively, and a gas storage tank 120 of the vehicle 100 and its bearing arrangement 163, 163' with integrated weighing devices 140, 140' are shown.

For reasons of clarity, no further details of the vehicle 100 are shown, for example a gas engine that can be fluidically connected to the withdrawal connection (port) 125 of the gas storage tank 100 via a pressure line (not shown) and a valve (not shown) and a tank connection that can be fluidically connected to the filling connection (port) 125 of the gas storage tank 100 via another pressure line (not shown) and another valve (not shown).

Figures 1B, 1C:
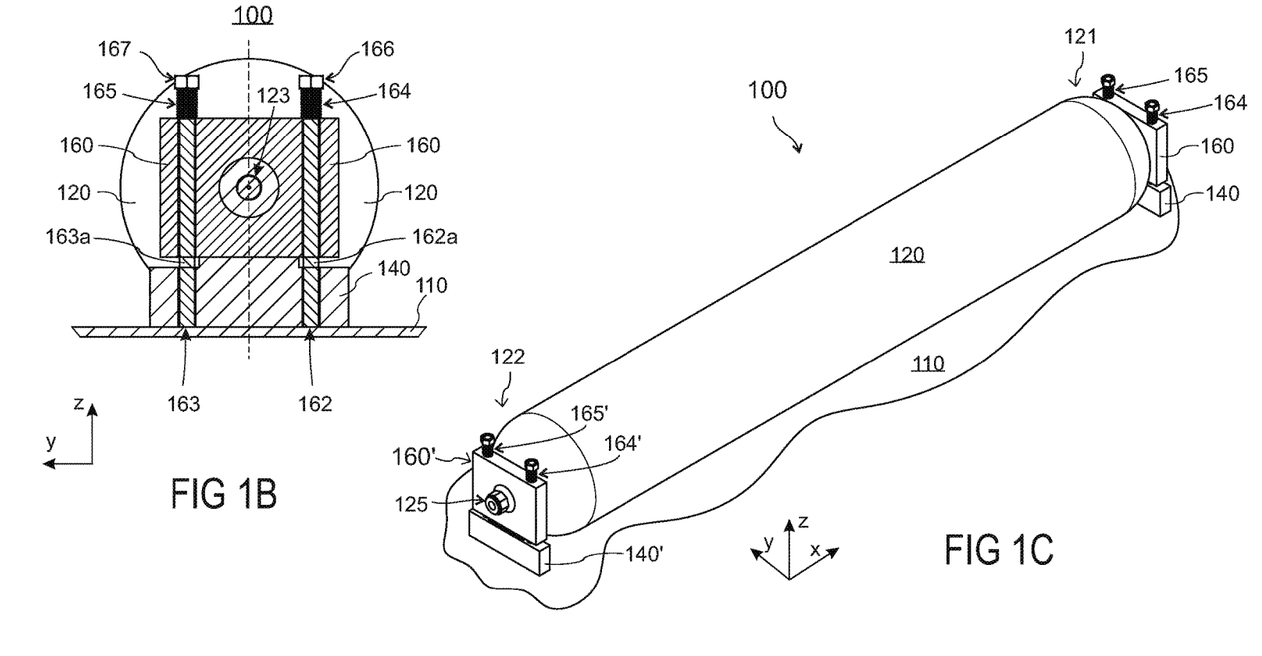
FIG. 1B A schematic cross-sectional view of the vehicle shown in FIG. 1A according to an embodiment.
FIG. 1C a perspective view of the vehicle shown in FIG. 1A according to an embodiment.

As can be seen in FIG. 1A and FIG. 1B, which corresponds to a cross-sectional view of the vehicle 100 along the line BB shown in FIG. 1A, and FIG. 1C, which corresponds to a perspective view of the vehicle 100, the exemplary gas storage tank 120 is substantially cylinder-symmetrical.

In addition, the longitudinal axis L of the gas storage tank 120, in normal operation of the vehicle 100, is substantially typically parallel to the ground, for example horizontally oriented.

In the exemplary embodiment, the gas storage tank 120 is beared (mounted) at its two ends 121, 122 via a respective bearing block 160, 160' on the first weighing device 140 and the second weighing device 140'.

For this purpose, the first end 121 of the gas storage tank 120 is firmly connected to the first bearing block 160 and the second end 122 of the gas storage tank 120 is firmly connected to the second bearing block 160'. The two bearing blocks 160, 160' rest on the first and the second weighing device 140, 140' respectively.

As shown in more detail in FIG. 1B for the first end 121, the bearing has a linear guide 163 that allows guided movement of the first bearing block 140 in the z-direction, which corresponds to the working direction of the first weighing device 140.

This applies analogously to the second end 122. However, since a cross-section along line B'B' in FIG. 1A is typically analogous to FIG. 1B, a correspondingly detailed sectional view is not provided for the second end 122.

In the exemplary embodiment, the linear guide 162, 163 is realized by means of two guide elements 162a, 163a, which can be implemented as guide pins or guide rails.

As further illustrated in FIG. 1B, the guide elements 162a, 163a can be fixed to the chassis 110 and can be guided by both the first weighing device 140 and the first bearing block 160.

Accordingly, the first weighing device 140, which is typically fixed to the chassis 110, as well as the first bearing block 160 can have corresponding z-directional openings for the guide elements 162a 163a.

As further detailed in FIG. 1B, above the first bearing block 160, a respective first spring damper 164, 165 can be pushed onto an upper section of the guide elements 162a 163a and connected to the respective guide element 162a 163a by means of a respective nut 166, 167 in such a way that a preload is exerted on the first bearing block 160 and thus the first weighing device 140 via the spring dampers 164, 165.

Figure 2A:
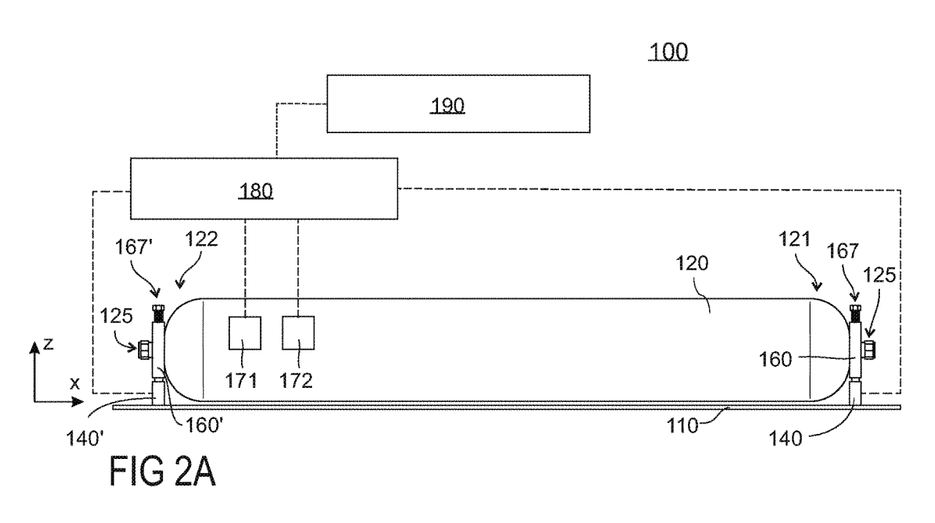
FIG. 2A another schematic side view of the vehicle shown in FIG. 1A according to an embodiment.
Figure 2B:
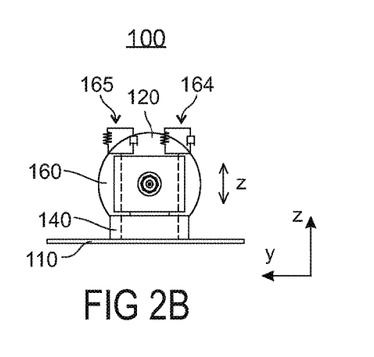
FIG. 2B another schematic cross-sectional view of the vehicle shown in FIG. 1A according to an embodiment.
Figure 2C:
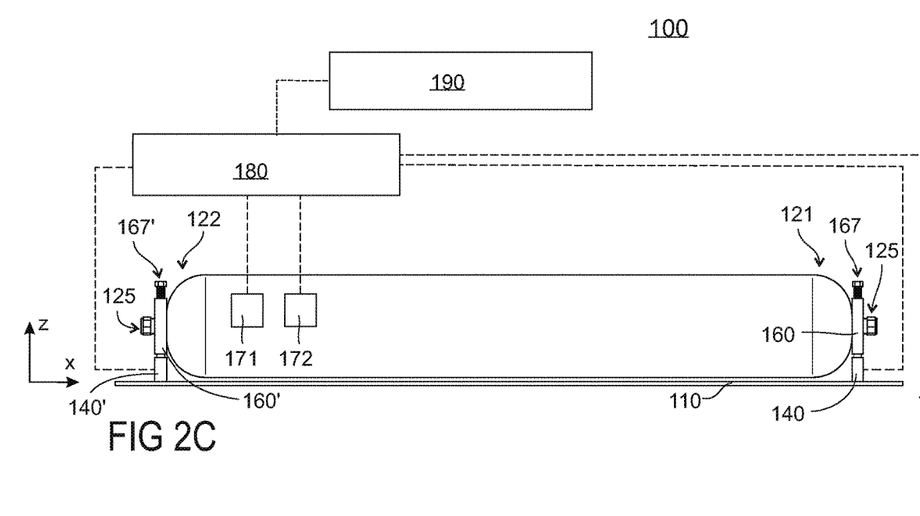
FIG. 2C another schematic side view of the vehicle shown in FIG. 1A according to an embodiment.
Figure 2D:
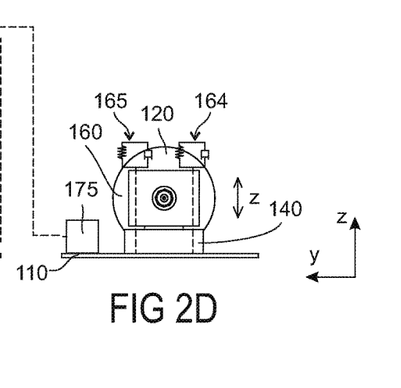
FIG. 2D another schematic cross-sectional view of the vehicle shown in FIG. 1A according to an embodiment.

This effect of the spring dampers 164, 165 is symbolized in FIGS. 2B, 2D by the use of corresponding circuit symbols.

As shown in FIG. 2A, which shows another schematic side view of the vehicle 100, the two weighing devices 140, 140' are typically connected to a measuring and/or evaluation unit 180 of the vehicle 100 via corresponding data links shown as dashed lines, which typically form part of a vehicle control unit of the vehicle 100. Data connections can correspond to data lines of a field bus (e.g. a CAN bus) but also wireless connections.

The measuring and/or evaluation unit 180 is configured to store and/or process first measurement data obtained from the first weighing device 140 and second measurement data obtained from the second weighing device 140', in particular to use the first and/or second measurement data to calculate the weight/mass of the tank contents.

In addition, the calculated weights or masses of the tank contents can be output by an output unit 190 connected to the measuring and/or evaluation unit 180 via a corresponding data connection, e.g. a display.

Furthermore, the measuring and/or evaluation unit 180 can be connected via appropriate data connections to a temperature sensor 171, which can be mounted in or at the gas storage tank 120, and/or to a pressure sensor 172, which is in fluidic contact with the interior of the gas storage tank 120.

As already explained above, measured values of the temperature sensor 171 and/or the pressure sensor 172 from the measuring and/or evaluation unit 180 and/or the vehicle control unit 180 can be used for comparative calculations and/or for the control (especially when refueling the gas storage tank 120) of non-displayed valves fluidically connected to the ports 125 and/or 123.

As shown in FIGS. 2C and 2D, the measuring and/or evaluation unit 180 can be connected via a corresponding data link to an acceleration sensor 175, which is mounted on the chassis 110.

Alternatively, the accelerometer 175 can also be attached to the gas storage tank 120.

As also explained above, measured values from accelerometer 175 can be taken into account by the measuring and/or evaluation unit 180 when calculating the weight or mass of the tank contents and/or can be used to collect or take into account measured values from the weighing devices 140, 140' only if, for example, the acceleration values determined by accelerometer 175 are below a corresponding (specified) threshold value.

Figure 3A:
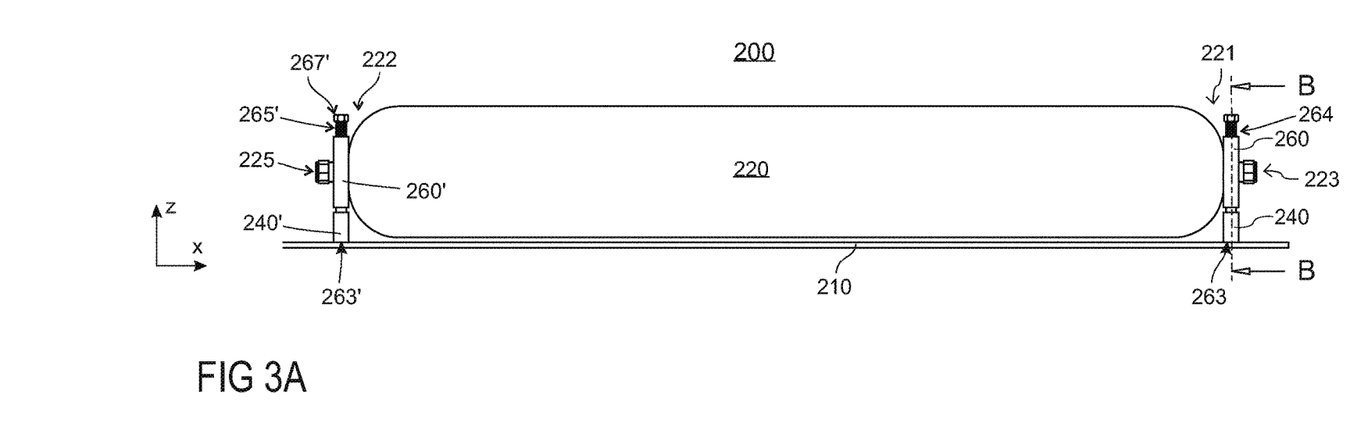
FIG. 3A a schematic side view of a vehicle with a gas storage tank according to an embodiment.

FIG. 3A shows a schematic side view or cross-sectional view of an interior part of a vehicle 200. Vehicle 200 is typically similar to vehicle 100, which is explained above with reference to FIGS. 1A through 2D. Vehicle 200 also has a gas storage tank 220 as a tank for a propellant gas such as compressed natural gas and is typically also a motor vehicle. It differs from vehicle 100, however, in the bearing of the gas storage tank 220.

Figure 3B:
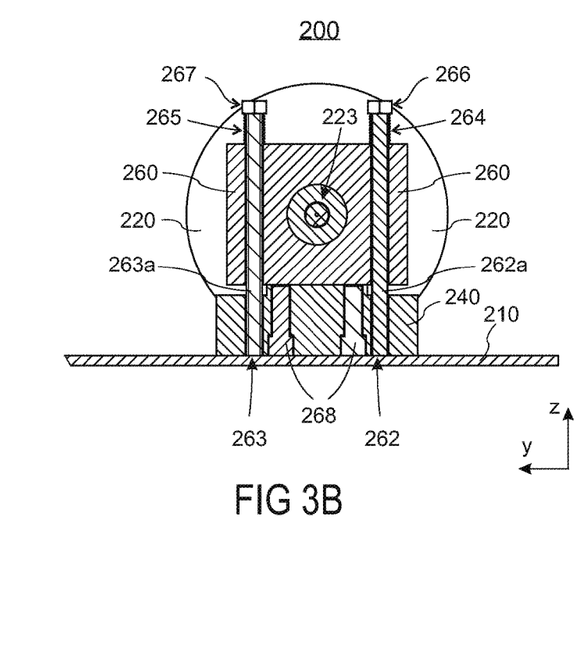
FIG. 3B a schematic cross-sectional view of the vehicle shown in FIG. 3A according to an embodiment.
Figure 3C:
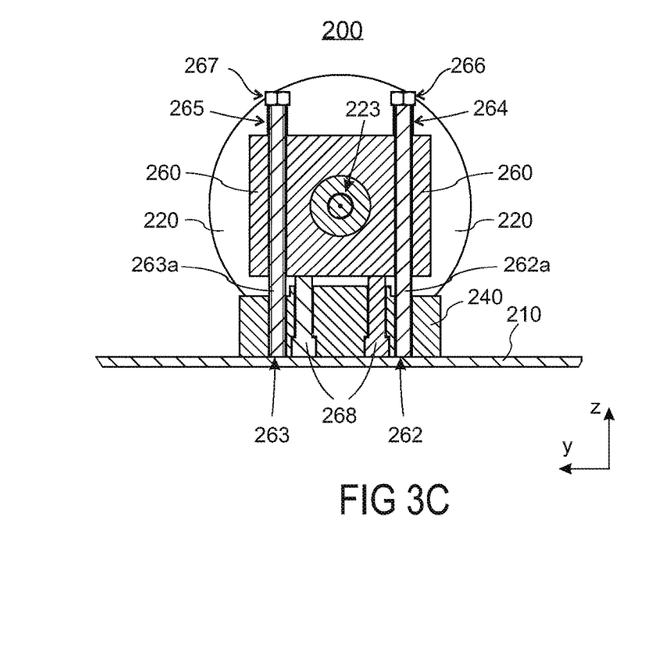
FIG. 3C another schematic cross-sectional view of the vehicle shown in FIG. 3A according to an embodiment.

As is illustrated in more detail in FIGS. 3B and 3C, which represent cross-sectional views along line BB in FIG. 3A, the bearing of the gas storage tank 220 typically has two locking elements 268 at each of the two ends 221, 222, implemented as pins, punches, spindles or mandrels for lifting and locking the respective bearing block 260, 260'. For reasons of clarity, however, corresponding cross-sectional representations are not shown for the second end 222.

FIG. 3B represents a first state of the bearing, in which the locking elements 268 are retracted and the first load cell 240 is loaded via the first bearing block 260 with a weight proportion of typically at least on average about 50% of the total mass of the gas storage tank 220. In the first state, especially when the vehicle is stationary 200, e.g. when refueling, a simple and reliable determination of the total mass/weight of the gas storage tank 220 can be made using the measured values determined by the weighing devices 240, 240' and on this basis a determination of the mass/weight of the tank contents can be made.

FIG. 3C represents a second state of the bearing in which the locking elements 268 are extended and the first bearing block 240 is raised and at least largely locked. The second state of the bearing is unsuitable for determining the mass/weight of the tank contents. However, it can at least largely prevent unwanted vibrations of the gas storage tank 220 while the vehicle 200 is moving.

Figure 4:
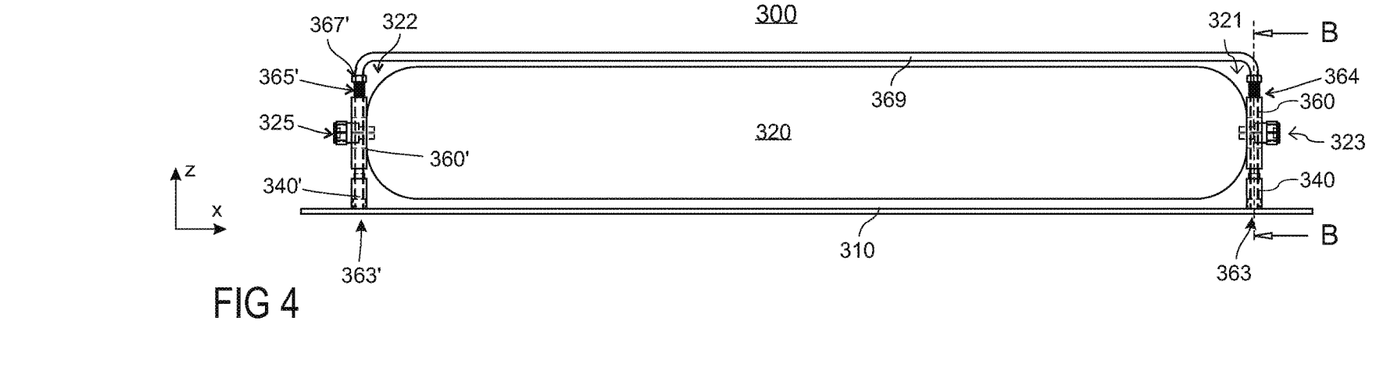
FIG. 4 a schematic side view of a vehicle with a gas storage tank according to an embodiment.

FIG. 4 shows a schematic side view or cross-sectional view of an inner part of a vehicle 300. The vehicle 300 is typically similar to the vehicles 100, 200 explained above with reference to FIGS. 1A to 3C. The vehicle 300 also has a gas storage tank 320 as a tank for a propellant gas and is typically also a motor vehicle. However, the bearing of the gas storage tank 320 has an additional stabilizing connector, in particular a tubular and/or stirrup-shaped connector 369 between the first end 321 and the second end 322.

Figure 5:
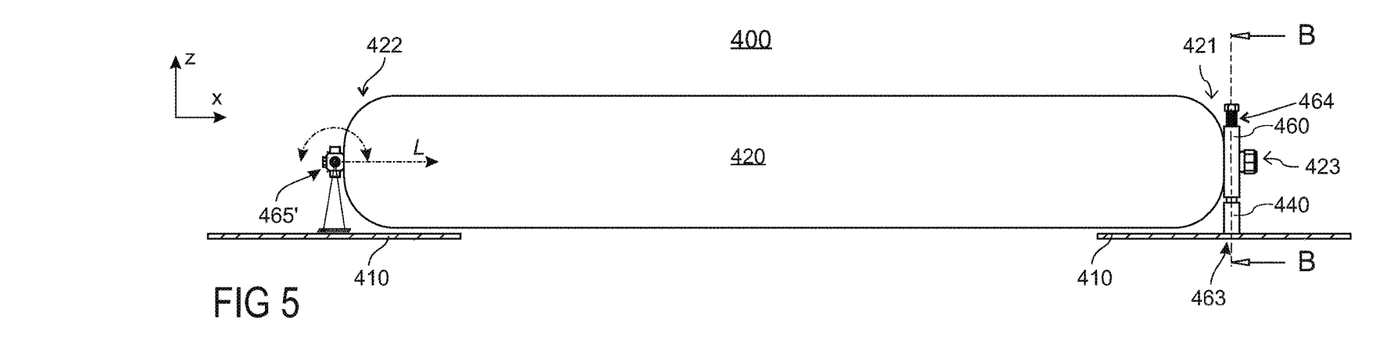
FIG. 5 a schematic side view of a vehicle with a gas storage tank according to an embodiment.

FIG. 5 shows a schematic side view or cross-sectional view of an inner part of a vehicle 400. The vehicle 400 is typically similar to the vehicles 100, 200, 300 explained above with reference to FIGS. 1A to 4. The vehicle 400 also has a gas storage tank 420 as a tank for a propellant gas and is typically also a motor vehicle. However, vehicle 400 has only a first weighing device 440 for measuring a contact force at the first end 421 of the gas storage tank 410. In addition, the bearing of the second end 422 of the gas storage tank 420 is designed differently from the bearing of the first end 421, which may be similar or identical to the bearing of the first end of vehicles 100 to 400.

In the exemplary embodiment, a clamp bearing 465' is used for the bearing of the second end 422.

However, the clamp bearing 465' is attached to the frame 410, for example to a base plate or cross strut 410.

The clamp bearing 465' is typically implemented so that the gas storage tank 420 is movable around a first axis oriented in y-direction. For example, the clamp bearing 465' can be implemented in such a way that a longitudinal axis "L" of the gas storage tank 420 is movable at least by several degrees or even several 10° around the first axis. However, these values may depend on the shape and especially on the length of the gas storage tank (distance between the ends 421, 422).

In addition, the clamp bearing 465' can be implemented in such a way that movement of the gas storage tank 420 around further axes is inhibited.

In addition, a barrel bearing or roller bearing can be provided between the gas storage tank 420 and the first bearing block 460. In this way, the influence of a tilt on the weight measurement by means of the first weighing device 440 can be reliably avoided.

In the following a measuring method 1000 is explained with reference to FIG. 6.

Firstly, in a block 1100, a first measured value can be determined with the first weighing device of a vehicle as described herein.

In a subsequent block 1200, the first measured value can be used to determine a weight of the gas storage tank of the vehicle and/or a weight of a gas filling of the gas storage tank.

The weight of the gas filling is typically determined as the difference between the total weight and the empty weight of the gas storage tank including the weight of the bearing block(s).

In addition, when determining the weight of the gas filling, any spring force acting on the gas storage tank is typically subtracted.

Figure 6:
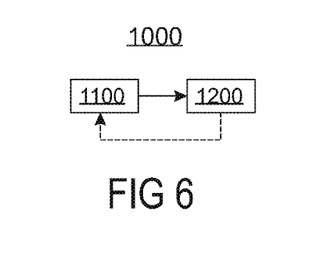
FIG. 6 a block diagram of a measuring method according to an embodiment.

As shown by the dotted arrow in FIG. 6, method 1000 can be repeated several times, for example during the refueling of the gas storage tank with a liquefied or compressed gas, during a stopover of the vehicle or even while the vehicle is moving.

In accordance with an embodiment, a vehicle comprises a chassis, a gas storage tank for a gas, in particular a gas storage tank for a liquefied or compressed gas in the form of a gas pressure vessel, and a first weighing device arranged between the chassis and the gas storage tank and connected to the chassis and the gas storage tank. The first weighing device is configured to determine a measured value which is correlated with a force exerted by the gas storage tank on the first weighing device, in particular with a weight force exerted by the gas storage tank on the first weighing device.

The present invention was explained by means of exemplary embodiments. These embodiments should in no way be understood as restrictive for the present invention. The following claims represent a first, non-binding attempt to define the invention in general.

LIST OF REFERENCE NUMBERS 100, 200, 300, 400 Vehicle
110, 210, 310, 410 Chassis
120, 220, 320, 420 Gas storage tank
140, 240, 340, 440 first weighing device
140', 240', 340' second weighing device
121, 221, 321, 421 first end of the gas storage tank
122, 222, 322, 422 second end of the gas storage tank
123, 223, 323, 423 Tapping connection of the gas storage tank (motor side)
125, 225, 325 Filling connection of the gas storage tank
160, 260, 360, 460 first bearing block
160', 260', 360' two of the bearing pedestals
162, 163, 262, 263, 363, 463 first linear guide
162', 163', 263', 363' second linear guide
162a, 163a Guide element (pin, rail) of the first linear guide
164, 165, 264, 265, 364, 464 first spring/spring-damper unit
164', 165', 265', 365' second spring/spring-damper unit
166, 167, 167', 266, 267' Nuts
171 Temperature sensor
172 Pressure sensor
175 Accelerometer
180 Measuring and/or evaluation unit
190 Display unit/Display
268 Locking element
369 Connectors, brackets
465' Clamp bearing
1000 Measuring method
1100, 1200 Method steps

The invention claimed is:

1. A vehicle, comprising:
a chassis;
a gas storage tank for a gas; and
a first weighing device arranged between the chassis and the gas storage tank and connected to the chassis and the gas storage tank, the first weighing device being configured to measure a force exerted by the gas storage tank on the first weighing device, wherein the gas storage tank is at least substantially cylindrical, comprises a first end, a second end opposite the first end, and/or comprises a longitudinal axis, wherein the second end of the gas storage tank is movably mounted in the direction of its longitudinal axis, wherein the second end of the gas storage tank is rotatably mounted about an at least substantially horizontally oriented first axis, wherein the first end and/or the second end are connected to a respective flexible and/or displaceable pressure pipe, wherein the gas storage tank rests on the first weighing device, wherein a first end of the gas storage tank rests on the first weighing device, and/or wherein the second end is arranged opposite the first end in the direction of the longitudinal axis.

2. The vehicle according to claim 1, the vehicle comprising a second weighing device arranged between the chassis and the gas storage tank and connected to the chassis and the gas storage tank, the second weighing device being adapted to measure a force exerted by the gas storage tank on the second weighing device.

3. The vehicle according to claim 2, wherein the second end of the gas storage tank rests on the second weighing device, and/or wherein the second weighing device forms part of the bearing arrangement.

4. The vehicle according to claim 1, wherein the vehicle comprises at least one further gas storage tank for the gas, which is connected mechanically fixedly and/or immovably to the gas storage tank, and fluidically connected to the gas storage tank, wherein the vehicle is a motor vehicle, a rail vehicle, a water vehicle and/or an aircraft, and/or wherein the vehicle is a passenger car, a bus or a truck, for example a tanker.

5. The vehicle according to claim 1, wherein the respective weighing device comprises a load cell and/or is a load cell.

6. The vehicle according to claim 1, wherein the vehicle comprises a measuring and/or evaluation unit connected to the first and/or the second weighing device, a level indicator connected to the first and/or the second weighing device and/or the measuring and/or evaluation unit, and/or wherein the vehicle comprises an acceleration sensor connected to the measuring and/or evaluation unit for measuring an acceleration of the gas storage tank.

7. A vehicle, comprising:
a chassis;
a gas storage tank for a gas; and
a first weighing device arranged between the chassis and the gas storage tank and connected to the chassis and the gas storage tank, the first weighing device being configured to measure a force exerted by the gas storage tank on the first weighing device, wherein the vehicle comprises a bearing arrangement for the gas storage tank connected to the chassis, and/or wherein the first weighing device forms part of a bearing arrangement for the gas storage tank, wherein the bearing arrangement comprises a first bearing block connected to said first end, wherein the bearing arrangement comprises a first linear guide for the first bearing block, wherein the bearing arrangement comprises a second bearing block connected to said second end, wherein the bearing arrangement comprises a second linear guide for the second bearing block, wherein the bearing arrangement comprises a first spring capable of exerting a spring bias on the first bearing block in the direction of the first weighing device, wherein the bearing arrangement comprises a first damper for damping a movement of the first bearing block in a direction of movement of the first linear guide, wherein the bearing arrangement comprises a first spring damper unit for influencing the movement of the first bearing block in the direction of movement of the first linear guide, wherein the bearing arrangement comprises a second spring capable of exerting a spring bias on the second bearing block in the direction of the second weighing device, wherein the bearing arrangement comprising a second damper for damping a movement of the second bearing block in a direction of movement of the second linear guide, and/or wherein the bearing arrangement comprises a second spring-damper unit for influencing the movement of the second bearing block in the direction of movement of the second linear guide.

8. The vehicle according to claim 7, wherein the bearing arrangement comprises a first state in which the gas storage tank is movably mounted relative to the chassis in a further direction which is perpendicular to the longitudinal axis of the gas storage tank, and/or wherein the further direction corresponds to a working direction of the first weighing device and/or the second weighing device.

9. The vehicle according to claim 8, wherein the bearing arrangement comprises a second state in which the gas storage tank, the first end and/or the second end are connected to the chassis at least substantially immovably in the further direction.

10. The vehicle according to claim 8, wherein the gas storage tank is preloaded in the further direction relative to the chassis, the first weighing device and/or the second weighing device.

11. A vehicle, comprising:
a chassis;
a gas storage tank for a gas; and
a first weighing device arranged between the chassis and the gas storage tank and connected to the chassis and the gas storage tank, the first weighing device being configured to measure a force exerted by the gas storage tank on the first weighing device, wherein a bearing arrangement for the gas storage tank is configured to be temporarily fixed and/or stiffened, wherein the bearing arrangement for the gas storage tank is implemented such that a first end of the gas storage tank is configured to be temporarily fixed and/or stiffened in a working direction of the first weighing device, and/or wherein the bearing arrangement for the gas storage tank is implemented such that a second end of the gas storage tank is configured to be temporarily fixed and/or stiffened in a working direction of the second weighing device.

12. The vehicle according to claim 11, wherein the gas storage tank is at least substantially cylindrical, and/or comprises a longitudinal axis, wherein the second end of the gas storage tank is movably mounted in the direction of its longitudinal axis, wherein the second end of the gas storage tank is rotatably mounted about an at least substantially horizontally oriented first axis, wherein the first end and/or the second end are connected to a respective flexible and/or displaceable pressure pipe, wherein the gas storage tank rests on the first weighing device, wherein the first end of the gas storage tank rests on the first weighing device, and/or wherein the second end is arranged opposite the first end in the direction of the longitudinal axis.

13. The vehicle according to claim 11, wherein the bearing arrangement comprises a first bearing block connected to said first end, wherein the bearing arrangement comprises a first linear guide for the first bearing block, wherein the bearing arrangement comprises a second bearing block connected to said second end, wherein the bearing arrangement comprises a second linear guide for the second bearing block, wherein the bearing arrangement comprises a first spring capable of exerting a spring bias on the first bearing block in the direction of the first weighing device, wherein the bearing arrangement comprises a first damper for damping a movement of the first bearing block in a direction of movement of the first linear guide, wherein the bearing arrangement comprises a first spring damper unit for influencing the movement of the first bearing block in the direction of movement of the first linear guide, wherein the bearing arrangement comprises a second spring capable of exerting a spring bias on the second bearing block in the direction of the second weighing device, wherein the bearing arrangement comprising a second damper for damping a movement of the second bearing block in a direction of movement of the second linear guide, and/or wherein the bearing arrangement comprises a second spring-damper unit for influencing the movement of the second bearing block in the direction of movement of the second linear guide.

14. The vehicle according to claim 13, wherein the direction of movement of the second linear guide is parallel to the direction of movement of the first linear guide.

15. The vehicle according to claim 13, wherein the bearing arrangement comprises a first locking element for locking the first bearing block in the direction of movement of the first linear guide, and/or wherein the bearing arrangement comprises a second locking element for locking the second bearing block in the direction of movement of the second linear guide.

16. A measuring method, the method comprising:
determining a first measured value with a first weighing device of a vehicle, the vehicle further comprising a chassis and a gas storage tank, wherein the first weighing device is connected to the chassis and the gas storage tank, and configured to measure a force exerted by the gas storage tank on the first weighing device; and
using the first measured value to calculate a weight of the gas storage tank of the vehicle and/or a weight of a gas filling of the gas storage tank, wherein the determining of the first measured value is carried out several times while the vehicle is stationary, during a filling of the gas storage tank with a gas from a filled gas buffer storage tank, and/or during a filling of a gas buffer storage tank with a gas stored in the gas storage tank or while driving, wherein the determining of the first measured value is carried out taking into account measured data on an acceleration in the direction of acceleration due to gravity, and/or wherein the respective first measured value is only determined and/or taken into account if the measured data for the acceleration are below a predetermined threshold value.

17. The measuring method according to claim 16, further comprising:
determining a second measured value with the second weighing device of the vehicle;
using the second measured value to calculate the weight of the gas storage tank and/or the weight of the gas filling of the gas storage tank;
taking into account a spring force acting on the gas storage tank when calculating the weight of the gas storage tank and/or the weight of the gas filling of the gas storage tank;
storing and/or forwarding the calculated weight of the gas storage tank and/or the weight of the gas filling of the gas storage tank; and/or
transferring the bearing arrangement of the vehicle into a first state, in which the gas storage tank is movably mounted in a working direction of the first weighing device and/or in a working direction of the second weighing device, prior to determining the first measured value and/or the second measured value.

18. The measuring method according to claim 17, wherein the determining of the second measured value is carried out several times while the vehicle is stationary, during a filling of the gas storage tank with a gas from a filled gas buffer storage tank, and/or during a filling of a gas buffer storage tank with a gas stored in the gas storage tank or while driving, wherein the determining of the second measured value is carried out taking into account measured data on an acceleration in the direction of acceleration due to gravity, and/or wherein the respective second measured value is only determined and/or taken into account if the measured data for the acceleration are below a predetermined threshold value.

19. The measuring method according to claim 16, comprising activating and/or deactivating a fixation and/or a stiffening of a bearing arrangement for the gas storage tank, wherein the bearing arrangement is connected to the chassis.

* * * * *